United States Patent [19]
Larson

[11] 3,731,918
[45] May 8, 1973

[54] SHEET RELEASE FROM VACUUM CONVEYOR

[75] Inventor: Charles L. Larson, Crants Pass, Oreg.

[73] Assignee: Jeddeloh Bros. Sweed Mills, Inc., Gold Hill, Oreg.

[22] Filed: May 20, 1971

[21] Appl. No.: 145,170

[52] U.S. Cl. .................................. 271/74, 271/68
[51] Int. Cl. ..................... B65h 29/68, B65h 29/24
[58] Field of Search ..................... 271/74, 68, 71; 214/605

[56] References Cited

UNITED STATES PATENTS 3,490,764  1/1970  Muller et al. ........................... 271/74
3,306,609  2/1967  Beuck ..................................... 271/71

Primary Examiner—Richard E. Aegerter
Attorney—Kolisch, Hartwell & Dickinson

[57] ABSTRACT

Apparatus for releasing a sheet from the underside of a vacuum conveyor. The apparatus includes spaced-apart movable bars positioned on opposite sides of the conveyor, which bars, when signaled into action as a result of a sheet being sensed as being properly positioned in the apparatus, move downwardly and toward one another at oblique angles against the top of opposite sides of the sheet. With such action, the bars, through engaging and pushing down on the sheet, release it from the conveyor, and then follow its fall a sufficient distance to prevent undesirable sailing as the sheet approaches an underlying stack, or other support.

7 Claims, 4 Drawing Figures

PATENTED MAY 8 1973 3,731,918
SHEET 1 OF 2
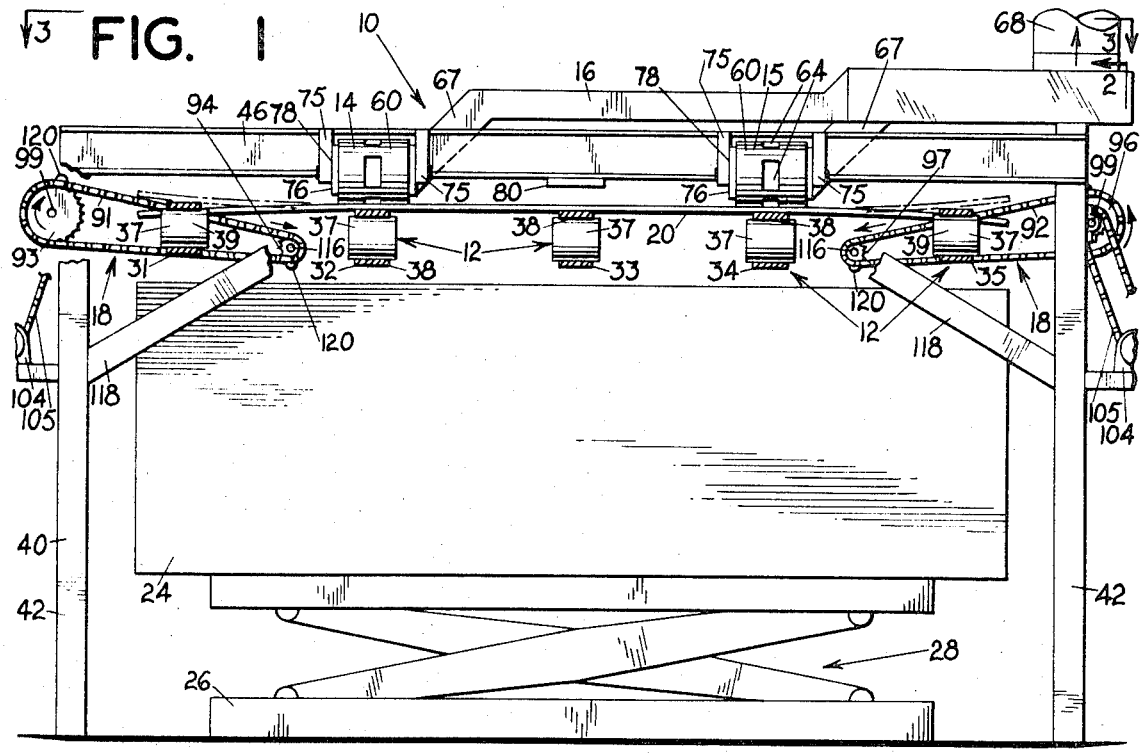
FIG. 1
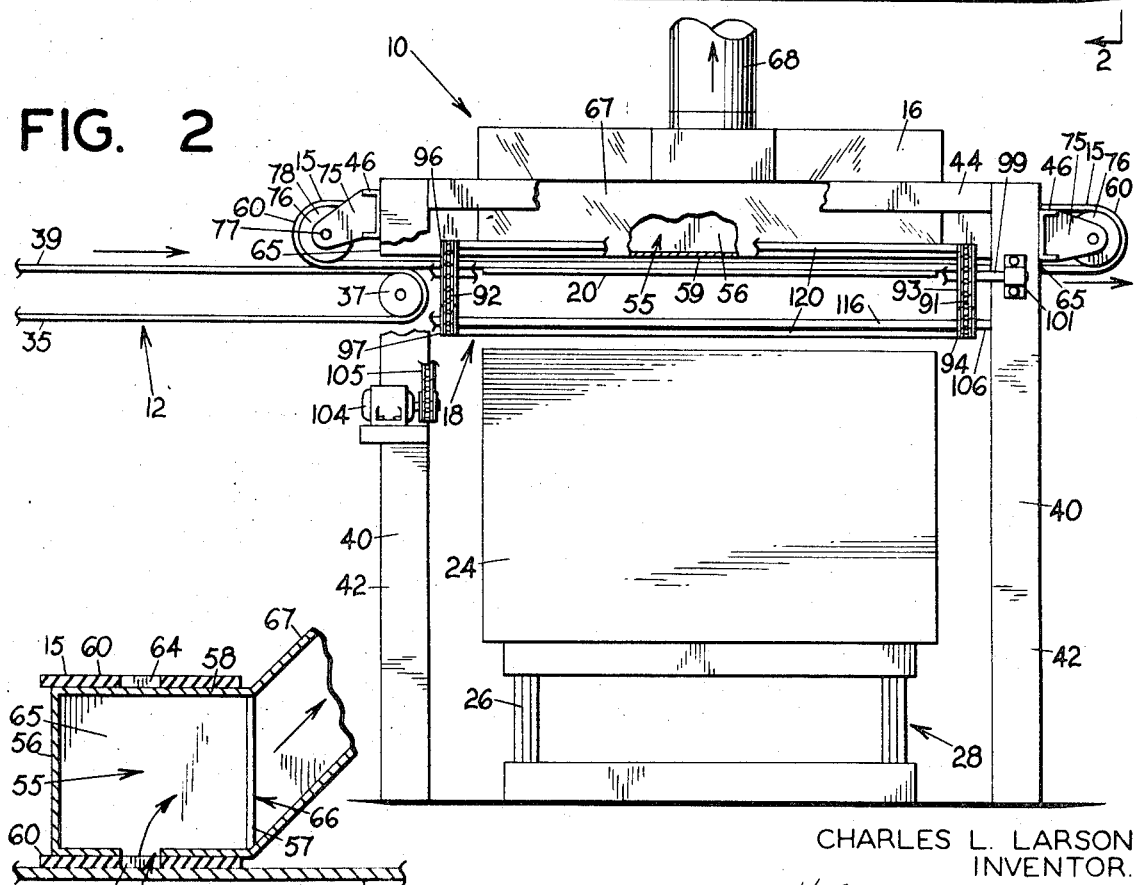
FIG. 2
FIG. 4
CHARLES L. LARSON
INVENTOR.
BY Kolisch, Hartwell &
Dickinson
ATTY

CHARLES L. LARSON
INVENTOR.

SHEET RELEASE FROM VACUUM CONVEYOR

BACKGROUND OF THE INVENTION

The use of vacuum belts or vacuum conveyors in sheet handling operations is well-known. In particular, in the lumber industry vacuum conveyors are used widely for transferring sheets, such as veneer sheets, to desired locations in stacking, sorting and lay-up operations. The usual vacuum conveyor includes one or more elongate belts with perforations or other aperture means therein through which vacuum is applied to the face of a sheet being handled. The sheet is usually placed against such a belt on the underside of a conveyor and retained there by the vacuum while being moved along with the belt to a desired location. When it is desired to remove the sheet from the belt, conventional operations require cutoff of the vacuum within the conveyor until the sheet falls free and drops into a bin or onto a stack.

Several problems arise in such operations. For example, repeated interruption of the vacuum within the conveyor results in high consumption of power by the conveyor. Furthermore, the additional time required to bring the vacuum in the conveyor up to an operable level is significant and results in a needless slowdown of the sheet handling operations. Also, when a sheet is released in this fashion from a conveyor, the sheet tends to sail or flutter down from the conveyor. When it is desired to drop sheets directly upon the top of a stack, such sailing action causes the sheets to fall imperfectly. Likewise, when it is desired to drop the sheets at some other particular location, such as upon another set of belts, the sheets again have a tendency to drop in the wrong positions and are therefore apt to be mishandled.

Various mechanisms have been proposed in the prior art to break sheets loose from vacuum conveyors. However, such mechanisms do not eliminate the problem of sheet sailing or flutter. Furthermore, the mechanisms previously used have placed certain limitations upon the speed of operation of the vacuum apparatus since the mechanisms must be retracted to a noninterfering position after handling each sheet before movement of the next sheet is possible. Also, some prior art release mechanisms are objectionable in that they can damage the surfaces of sheets being handled.

SUMMARY OF THE INVENTION

Accordingly, it is an object of the invention to provide improved sheet release means for a vacuum conveyor.

It is another object of the invention to provide a sheet release means which overcomes the disadvantages of conventional sheet release mechanisms used in dislodging a sheet held against the underside of a conveyor.

It is a further object of the invention to provide sheet release means for a vacuum conveyor which effectively removes sheets from the conveyor without requiring interruption of vacuum pressure therein.

It is yet another object to provide a sheet release means which does not damage the surfaces of the sheets being handled.

It is yet another object of the invention to provide sheet release means for a conveyor wherein the sheet is driven positively downward after being dislodged from the conveyor to minimize sheet flutter.

These and other objects of the invention are attained in a sheet release for a vacuum conveyor which includes one or more elongate belts with perforations therein through which vacuum pressure is applied to the face of the sheets being carried. Each sheet is moved against the underside of the belts, with its edges extending on either side of the conveyor, and retained there by vacuum as the sheet is moved along with the belts to a predetermined location, such as a stacking area. At the location where it is desired to remove sheets from the underside of the belt, sensing means and sheet release means responsive to the sensing means are provided selectively to engage the edges of a given sheet and remove the latter from the belt at a predetermined time.

The sheet release means includes pairs, or sets, of endless chains arranged on each side of the conveyor spaced outwardly from the sides of the stack. Each chain is trained over an arrangement of drive and idler sprockets. The chain sets are adapted during a release cycle to be driven in unison over predetermined, generally orbital courses extending from above and outside the extending edges of the sheet and progressing downwardly and inwardly toward the center of the sheet.

One or more release bars are connected between each set of chains and are adapted to traverse the orbital path followed by the chains. Thus, during a release cycle a bar is moved over each outwardly extending edge of the sheet and carried downwardly by the chains. The release bar then contacts the upper side of the sheet and breaks the sheet loose from the conveyor. The continuing inward and downward movement of the release bar propels the sheet positively downward as the release bar is moved by the set of chains. Ultimately, the sheet is deposited at the desired location, such as on the top of a stack or on another conveyor, and the release bar is stopped in a noninterferring position until the next release cycle.

In one preferred embodiment, two release bars are utilized on each set of chains. Accordingly, after the release of one sheet from the vacuum conveyor, another sheet can immediately be transferred along the conveyor to the release position. Upon its arrival at the desired release position, the second pair of release bars, mounted one on each of the respective sets of chains, is moved from a noninterfering outward position toward the release position and another release cycle is executed. This permits the handling of sheets at higher speeds than with a single pair of release bars.

BRIEF DESCRIPTION OF THE DRAWINGS

Other objects and advantages of the invention will become apparent from the following detailed description of the invention taken in conjunction with the accompanying drawings, wherein:

FIG. 1 is an end elevation view of a vacuum conveyor and release mechanism designed in accordance with the invention;

FIG. 2 is a side elevation view of the apparatus taken along lines 2—2 in FIG. 1;

FIG. 4 is an enlarged fragmentary cross-sectional view of one of the vacuum conveyors, taken along lines 4—4 in FIG. 3.

DETAILED DESCRIPTION OF THE INVENTION

Figure 3:
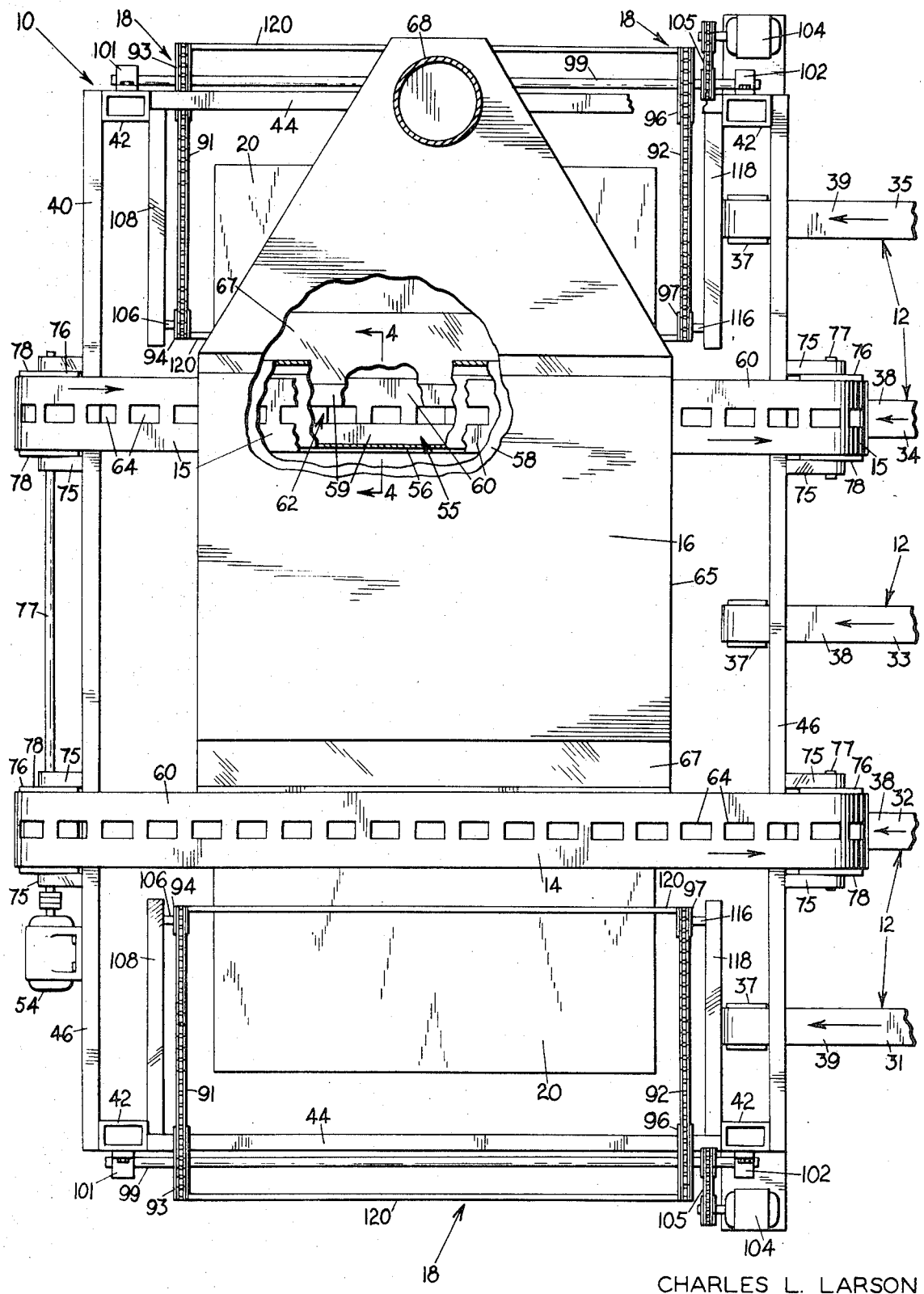
FIG. 3 is a top elevation view of the apparatus disclosed in FIG. 1, taken along lines 3—3 in FIG. 1.

Referring now to the drawings, one preferred embodiment of the invention is illustrated in the form of a vacuum conveyor and stacking arrangement including sheet release means designed in accordance with the invention. However, it should be understood that the sheet release means illustrated and described can be used with vacuum conveyors designed for sorting and lay-up operations, or other applications as well.

Referring now to FIGS. 1–4, the vacuum conveyor system is generally indicated at 10 as including an arrangement of infeed belts 12, and a pair of conveyors 14, 15 both connected to a vacuum manifold 16. Sheet release assemblies 18 are arranged on either side of the vacuum conveyors as viewed in FIG. 1. Conveyors 14, 15 are adapted to receive sheets, such as sheet 20, sequentially fed to the conveyors from the infeed belts, and to transfer such sheets along a predetermined path to a release position where the sheets are disposed over the top of a stack 24 supported on a scissor lift 26 located in a stacking area 28. Preferably, the sheets are handled with their longest dimension being arranged transverse to their direction of movement along the conveyors. However, this is not essential.

Conveyors 14, 15 and vacuum manifold 16 are generally supported over the stacking area on a framework 40 that includes legs 42, end members 44, and side members 46. The legs, end members and side members are formed of suitable material such as channel or angle iron and are secured together by suitable means, such as by bolted or welded joints. Various supporting struts, not illustrated, can be provided to provide adequate strength to the framework.

Conveyors 14, 15 are of identical construction and are adapted for movement in unison under the control of a single drive motor 54. Each conveyor includes a closed inner chamber 55, the cross section of which is particularly illustrated in FIG. 4. Each chamber 55 is defined by sides 56, 57, a top plate 58 upon which the upper reach of a conveyor belt 60 is movably supported, and a bottom plate 59 with a slot 62 formed along the central portion thereof, adapted to register with perforations 64 provided in belt 60. The ends of the inner chamber are closed by suitable means, such as plates 65 welded to the framework and to the chamber sides. In addition to the slot formed in bottom plate 59, an opening 66 formed in side 57 communicates with the inner chamber. One end of a duct 67 is connected around the periphery of opening 66 and the other end of the duct is connected to manifold 16 so that it conducts vacuum between the chamber and the manifold.

Vacuum manifold 16 is a pressure-tight structure supported above the conveyors by suitable means, and connected by a duct 68 to a remote vacuum source.

Each vacuum conveyor includes roller support brackets 75 secure to side members 46 of the framework. Rollers 76 are provided at each end of the conveyor, being secured to shafts 77 that are journaled in bearings 78 secured to brackets 75. As illustrated in FIG. 3, motor 54 is secured to one end of the shaft 77 located at the trailing edge of the conveyors for rotating the drive rollers and moving the belts in unison in the direction indicated by the arrows.

The arrangement of infeed belts includes five generally parallel endless belts 31-35 adapted to be driven in unison for the delivery of sheets to conveyor 14. The belts are of conventional design, each being provided with a drive roller 37 and an idler roller, not illustrated, which support the upper and lower reaches of the belts. The infeed belt rollers are supported from a suitable framework and can be driven at a predetermined speed by conventional drive means.

Infeed belts 32, 34 are aligned with vacuum conveyors 14, 15, respectively. Furthermore, the upper reaches 38 of the belts on infeed conveyors 32, 33 and 34 are positioned at a level just beneath the bottom level of conveyors 14, 15 respectively. The trailing end of each of infeed belts 31-35 extends past the leading ends of the conveyors 14, 15. However, the upper reaches 39 of infeed belts 31 and 35, arranged outwardly from conveyors 14, 15, are positioned at a level slightly above the lower level of conveyors 14, 15 and infeed belts 32-34.

Each sheet moved along the infeed belts is fed progressively into contact with the bottom surface of belts 60 of conveyors 14, 15, and particularly into contact with the perforations in belts 60 thereby serving to close off the perforations. Consequently, as a sheet leaves the infeed belts it is retained by vacuum in firm contact with the lower reaches of belts 60 of the conveyors and is carried toward the stacking area. The edges of the sheets extend on either side of the conveyors. However, since the upper reaches of infeed belts 31 and 35 are positioned above the bottom level of the vacuum conveyors, the sheets are bent upwardly at their ends as illustrated in dotted outline in FIG. 1. This serves to prevent the ends of the sheets from being driven into the sheet release assemblies and interfering with the operation thereof. It also serves to create good contact between the sheets and belts 60 of the conveyors. As the trailing edge of a sheet leaves the infeed belts the outer edges of the sheet drop slightly to the position illustrated in solid outline in FIG. 1.

Sheet sensing means 80, such as a conventional photo detector unit are provided suitably supported adjacent the path of the sheets to detect the approach thereof. The photo detector serves to detect the leading edge of the sheet as it passes a predetermined location on the conveyor and provides a signal in response thereto. The sensing means is connected to suitable control means for the release assembly motors, and the photo detector signals serve to control the timing of the sheet release cycles by starting and stopping the release assembly motors in a manner that is explained hereinafter.

Sheet release assemblies 18 are of substantially identical construction, but are secured on framework 40 in generally reversed positions. The structural details of one release assembly are described hereinafter, it being understood that the other release assembly is similarly constructed with like elements being designated by like numerals.

Referring to the bottom of FIG. 3, sheet release assembly 18 comprises a set of two endless flexible members or chains 91, 92 arranged on opposite sides of the stack. The chains are of conventional design, such as link chains. However, other means, such as flexible cables could be used as well. Chain 91 is trained over a drive sprocket 93 and an idler sprocket 94, and chain 92 is similarly trained over a drive sprocket 96 and an idler sprocket 97. Drive sprockets 93, 96 are secured to a shaft 99 that is journaled in bearings 101, 102 secured to the legs of framework 40. A motor 104 is connected through a drive chain 105 to shaft 99 for selectively rotating the shaft. Idler sprocket 94 is journaled on a shaft 106 that is secured to an arm 108 extending from the framework. In similar fashion, idler sprocket 97 is journaled on a shaft 116, that is secured to an arm 118 also extending from the framework.

In the embodiment illustrated, two elongated release bars 120 are provided, each being secured at its ends to links of chain 91 and chain 92 so as to be carried therewith. However, if desired one release bar could be used. The release bars are preferably constructed of tubular material and have smooth outer surfaces that do not damage the sheets upon engagement thereof.

As is apparent from FIG. 1, the sizes and positions of the sprockets are such that each endless chain traverses an endless, generally orbital course that begins above and outwardly of the extending edges of a given sheet and progresses inwardly toward the center of the sheet and downwardly below the bottom of the vacuum conveyor before returning around the idler sprocket towards its starting point. The chain courses therefore intersect the paths traversed by the extending edges of the sheets as the latter are carried along the conveyor. Consequently, if the chain sets are driven about their orbital paths through a release cycle just as a sheet moves into the stacking area, the release bars are moved into contact with the upper sides of each end of the sheet and serve to force the ends of the sheet downwardly until the sheet is dislodged from the vacuum conveyor. The continuing inward and downward movement of the release bars, particularly as the bars move around the idler sprockets, serves to maintain contact between the release bars and the falling sheet and provides a downward force or kick to the sheet that causes it to be deposited positively upon the stack.

In the operation of the described apparatus through a complete cycle, a sheet is fed to the vacuum conveyors from the infeed belts. As the sheet engages the bottom of the conveyors it is retained there by vacuum exerted through the perforations in the conveyor belts. The sheet is then carried with the conveyor belts toward the stacking area until the leading edge of the sheet approaches a predetermined location in advance of the desired release location where it is detected by the sensing means.

The sensing means provide a signal that is used to actuate motors 104 and drive the endless chains for a predetermined time to move the release bars through a release cycle. During such a cycle the release bars, secured to the chains, are moved inwardly of the ends of the sheet and engage the upper surface of the sheet. The release bars continue to traverse the orbital path followed by the chains whereby the sheet is dislodged from the conveyor above the desired release location and deposited neatly upon the stack. After the sheet is free from the release bars, the latter are stopped in a position below the sheet path that does not interfere with the movement of the next sheet along the conveyor.

Also, as the first set of release bars loses contact with a first sheet, the chains are stopped with the second set of release bars positioned appropriately for the start of another release cycle for the next sheet handled by the continuously moving conveyor.

After the formation of a stack of a predetermined height, the scissor lift is lowered to the bottom of the stacking area whereby the stack can be removed by conventional means, such as a fork lift.

It should be apparent that the sheet release assemblies described herein have many advantages over sheet release systems previously used. For example, the release mechanisms are of extremely simple design and do not interfere with the conveyors. Furthermore, due to the use of two or more release bars on each set of chains, the sheet release assemblies can be operated with continuously moving conveyors operating at higher speeds than was previously possible. Also, the downward kick applied to each sheet by the apparatus described deposits the sheet upon the stack under positive downward force with the sides of the sheet substantially in alignment with the edge of the stack. Likewise, the use of release bars having smooth surfaces that extend across the full width of the sheet largely eliminates the possibility of damage to the face of the sheet.

If desired, a number of stacking areas can be served, each being provided with release assemblies properly coordinated to selectively handle or omit handling any sheet being conveyed by the conveyors.

Furthermore, although the release assemblies have been described in connection with a stacking arrangement it should be apparent that they have utility with panel lay-up lines or other sheet handling apparatus.

It is claimed and desired to secure by letters patent:

1. Apparatus for releasing a sheet held by vacuum against the underside of a vacuum conveyor which is operable to transport the sheet along a predetermined path, said apparatus comprising
   a pair of elongated release bars,
   means mounting said bars adjacent opposite sides of said conveyor for movement from positions above said path downwardly and toward one another along courses obliquely intersecting opposite sides of said path,
   means for sensing the presence of a sheet held by said conveyor at a selected point along said path which is adjacent the bars, and
   power-operated drive means operatively connected both to said bars and to said sensing means for moving the former along said courses in response to sensing by the latter of a sheet at said selected point, such moving of said bars causing them to engage opposite upper side marginal portions of said sheet, and to urge the sheet downwardly, thus to release it from said conveyor.

2. The apparatus of claim 1, wherein said bars, when occupying said positions, are disposed outwardly of the opposite sides of said path.

3. The apparatus of claim 1, wherein the mounting means for a bar comprises a pair of sprocket-trained, movable endless chains, or the like, supporting opposite ends of the bar.

4. The apparatus of claim 3, wherein the chains for a bar are spaced apart along a line generally paralleling the longitudinal axis of said path, with the spacing between the chains being greater than the largest overall travel-direction dimension which is expected to be found in a sheet being transported by said conveyor, such dimension being measured along said axis.

5. Apparatus for releasing a sheet held by vacuum against the underside of a vacuum conveyor which is operable to transport the sheet along a predetermined path, said apparatus comprising a set of elongated release bars on each side of said path, means mounting the bars in a set for movement, one after another, from positions above the adjacent side of the path downwardly and toward the opposite side of the path along a course obliquely intersecting the path, means for sensing the presence of a sheet held by said conveyor at a selected point along said path which is adjacent said sets of bars, and power-operated drive means operatively connected both to said sets of bars and to said sensing means for coordinately and simultaneously moving the bars in said sets along said courses in response to sensing by the sensing means of a sheet at said selected point, such moving occurring with each bar in a set at all times complementarily positioned relative to a bar in the other set, and causing a pair of such complementarily positioned bars to engage opposite upper side marginal portions of said sheet, and to urge the sheet downwardly thus to release it from said conveyor.

6. The apparatus of claim 5, wherein the mounting means for a set of bars comprises a pair of sprocket-trained, movable endless chains, or the like, supporting opposite ends of the bars.

7. The apparatus of claim 6, wherein the chains for each set of bars are spaced apart along a line generally paralleling the longitudinal axis of said path, with the spacing between the chains being greater than the largest overall travel-direction dimension which is expected to be found in a sheet being transported by said conveyor, such dimension being measured along said axis.

* * * * *